(12) United States Patent
Ekstrum

(10) Patent No.: US 8,622,028 B2
(45) Date of Patent: Jan. 7, 2014

(54) HANDS FREE DOG WALKER

(75) Inventor: Thomas C. Ekstrum, Bellevue, NE (US)

(73) Assignee: 608 Enterprises, LLC, West Des Moines, IA (US)

( * ) Notice: Subject to any disclaimer, the term of this patent is extended or adjusted under 35 U.S.C. 154(b) by 0 days.

(21) Appl. No.: 13/588,398

(22) Filed: Aug. 17, 2012

(65) Prior Publication Data

US 2013/0042819 A1 Feb. 21, 2013

Related U.S. Application Data

(60) Provisional application No. 61/524,801, filed on Aug. 18, 2011.

(51) Int. Cl.
*A01K 27/00* (2006.01)

(52) U.S. Cl.
USPC .......................................... 119/770; 119/856

(58) Field of Classification Search
USPC .......... 119/770, 769, 771, 856, 857, 795, 796
See application file for complete search history.

(56) References Cited

U.S. PATENT DOCUMENTS

| | | | | |
|---|---|---|---|---|
| 2,356,715 A * | 8/1944 | Webster Richard C | ....... | 119/776 |
| 3,721,216 A | 3/1973 | Lippe et al. | | |
| 5,080,045 A * | 1/1992 | Reese et al. | .................. | 119/795 |
| 5,161,486 A * | 11/1992 | Brown | ........................... | 119/795 |
| 5,718,189 A * | 2/1998 | Blake | ........................... | 119/770 |
| 5,842,444 A | 12/1998 | Perrulli | | |
| 5,950,569 A * | 9/1999 | Perrulli | ........................... | 119/770 |
| 6,192,835 B1 * | 2/2001 | Calhoun et al. | ................ | 119/792 |
| 6,247,428 B1 * | 6/2001 | Mireles | ........................... | 119/795 |
| D454,992 S | 3/2002 | Yantz | | |
| 6,450,129 B1 * | 9/2002 | Flynn | ............................ | 119/770 |
| 6,553,944 B1 | 4/2003 | Allen et al. | | |
| 6,626,131 B2 | 9/2003 | Moulton, III | | |
| 6,732,834 B2 * | 5/2004 | Colorado | ........................... | 182/6 |
| 6,851,393 B2 * | 2/2005 | Bremm | ........................... | 119/770 |
| 6,932,027 B1 * | 8/2005 | Whitney | ........................ | 119/770 |
| 7,103,943 B2 * | 9/2006 | Lambert | ........................... | 24/298 |
| 7,114,467 B2 * | 10/2006 | Jones | ........................... | 119/795 |
| 7,467,604 B1 * | 12/2008 | Werner et al. | ................... | 119/770 |
| 7,516,717 B2 * | 4/2009 | David et al. | .................... | 119/770 |
| 8,342,137 B1 * | 1/2013 | Burkhardt | ..................... | 119/792 |
| 8,393,302 B1 * | 3/2013 | Blakemore | ................... | 119/796 |
| 2004/0194733 A1 * | 10/2004 | Bremm | ........................ | 119/770 |
| 2005/0229867 A1 * | 10/2005 | Green | ........................... | 119/770 |
| 2007/0012262 A1 | 1/2007 | Cole | | |
| 2009/0044763 A1 | 2/2009 | Russo et al. | | |
| 2010/0024742 A1 * | 2/2010 | Honeycutt et al. | ............ | 119/795 |
| 2012/0067297 A1 * | 3/2012 | Reyes | ............................ | 119/792 |
| 2013/0042818 A1 * | 2/2013 | Capoano | ....................... | 119/770 |

* cited by examiner

*Primary Examiner* — Yvonne Abbott

(74) *Attorney, Agent, or Firm* — McKee, Voorhees & Sease, P.L.C.

(57) ABSTRACT

A hands free dog walking system includes a belt for attaching around a person includes a belt for attaching around a person and a traveler operatively connected to the belt to allow a leash operatively connected to the traveler to freely travel around the belt without entangling the person. The system may further include a leash assembly having a first rigid body having an inner end and an outer end, a second rigid body having an inner end and an outer end, a cord threaded through the first rigid body and the second rigid body, a first connector attached to the first end of the cord, and a second connector attached to the second opposite end of the cord.

13 Claims, 13 Drawing Sheets

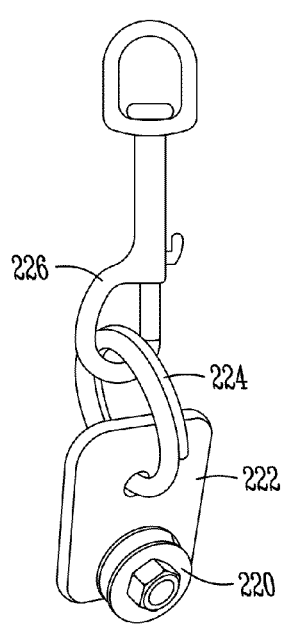
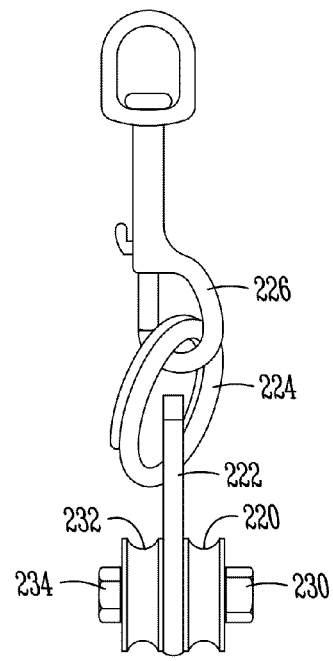
Fig. 14          Fig. 15
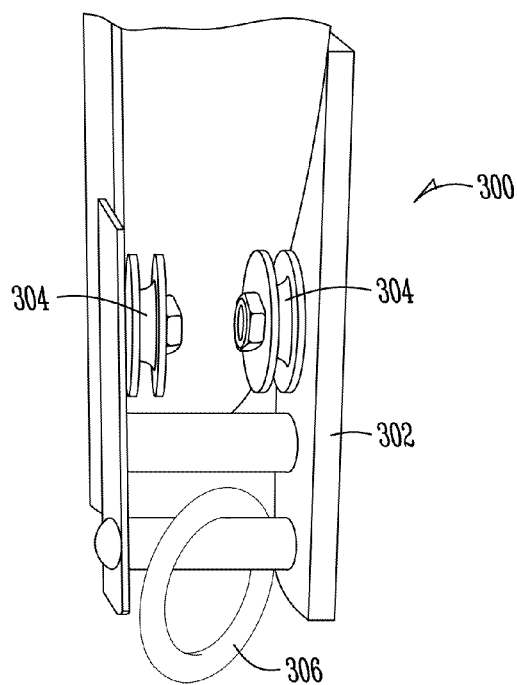
Fig. 16

HANDS FREE DOG WALKER

CROSS-REFERENCE TO RELATED APPLICATIONS

This application claims priority under 35 U.S.C. §119 of a provisional application Ser. No. 61/524,801 filed Aug. 18, 2011, and which application is hereby incorporated by reference in its entirety.

FIELD OF THE INVENTION

The present invention generally relates to a hands free dog walker.

BACKGROUND OF THE INVENTION

Dog walking is a common activity practiced by many people every day. Leashes allow individuals to control their dog during walking. In addition, various laws and regulations may require that dogs being walked are on leashes. Alternatively, these laws or regulations may place limitations on the length of the leash or otherwise place restrictions on dog walking. Generally a chain, strap, cord, etc., is used for controlling or leading a dog or other animal while walking or running. Generally a leash or lead will have a loop on one end and a clasp on the other of a fixed chain, strap or cord. The loop is held by a person with their hand and the clasp is attached to a dog collar. When walking, jogging or running with a dog a person's movements are limited by holding the leash within their hand. The dog is also limited to being on either the person's left or right side during the walk, as allowing the dog freedom to travel around the person would result in entangling the leash around the person.

In addition, because a person's hand is needed on the leash, the person may not be able to perform other activities such as operating a cell phone, adjusting settings on a music player, or other activities while walking the dog.

What is needed is an apparatus and method for a hands free dog walker having the advantage of freedom of movement for the person and dog without sacrificing the person's ability to control the dog.

BRIEF SUMMARY OF THE INVENTION

Therefore it is a primary, object, feature, or advantage of the present invention to improve over the state of the art.

It is a further object, feature, or advantage of the present invention to provide a hands free dog walker.

Another object, feature, or advantage of the present invention is to provide a hands free dog walker which allows a dog to move back and forth and even around a person walking the dog.

A still further object, feature, or advantage of the present invention is to provide a leash which easily allows a person to exercise greater control over a dog when needed, such as to prevent the dog from wrapping itself around a pole or hydrant.

One or more of these and/or other objects, features, or advantages of the present invention will become clear from the specification and the claims that follow. No single embodiment need exhibit each and every object, feature, or advantage.

One aspect of the present invention is directed to a hands free dog walking system. The hands free dog walking system includes a belt for attaching around a person, a traveler operatively connected to the belt to allow a leash operatively connected to the traveler to freely travel around the belt without entangling the person. The traveler may include a ring with a slot. The ring may be a D-ring. The hands free dog walking system may further include a plurality of pads attached to an inside of the belt with stands whereby the pads are separated from the belt by the stands and the slot of the ring is configured to pass through the stands. The belt may include a plurality of apertures, each of the apertures having a circular portion and a slot extending from the circular portion towards a nearest end of the belt. There may also be a fastener such as a pin on one end of the belt for matingly connecting with one of the apertures. The opposite end of the belt may also have such a fastener. The belt may be made of plastic and is preferably rigid. The hands free dog walking system may also include a leash assembly.

According to another aspect of the present invention, a leash assembly for walking a dog with a leash is provided. The leash assembly includes a first rigid body having an inner end and an outer end and a second rigid body having an inner end and an outer end. The leash assembly further includes a cord threaded through the first rigid body and the second rigid body such that the outer end of the first rigid body is at a first end of the cord and the outer end of the second rigid body is at a second opposite end of the cord. A first connector may be attached to the first end of the cord and a second connector may be attached to the second opposite end of the cord. The first rigid body and the second rigid body may be formed of plastic. The first rigid body and the second rigid body may be formed of tubing. The first connector may include a fastener for connecting to a collar of the dog. The second connector may include a fastener for connecting to a slotted D-ring configured to rotate around a belt of a person walking the dog.

According to another aspect of the present invention, a hands free dog walking system is provided. The system includes a belt for attaching around a person, a traveler operatively connected to the belt to allow a leash operatively connected to the traveler to freely travel around the belt without entangling the person. The leash assembly may include a first rigid body having an inner end and an outer end, a second rigid body having an inner end and an outer end, and a cord threaded through the first rigid body and the second rigid body such that the outer end of the first rigid body is at a first end of the cord and the outer end of the second rigid body is at a second opposite end of the cord. The leash assembly may further include a first connector attached to the first end of the cord; and a second connector attached to the second opposite end of the cord.

BRIEF DESCRIPTION OF THE DRAWINGS

FIGS. 14 and 15 illustrate a carriage or slider.

FIGS. 16 and 17 illustrate another embodiment.

DETAILED DESCRIPTION

The present invention provides for a hands free dog walker system. Although various embodiments are described, it is to be understood that the present invention contemplates numerous variations, options, and alternatives.

Figure 1:
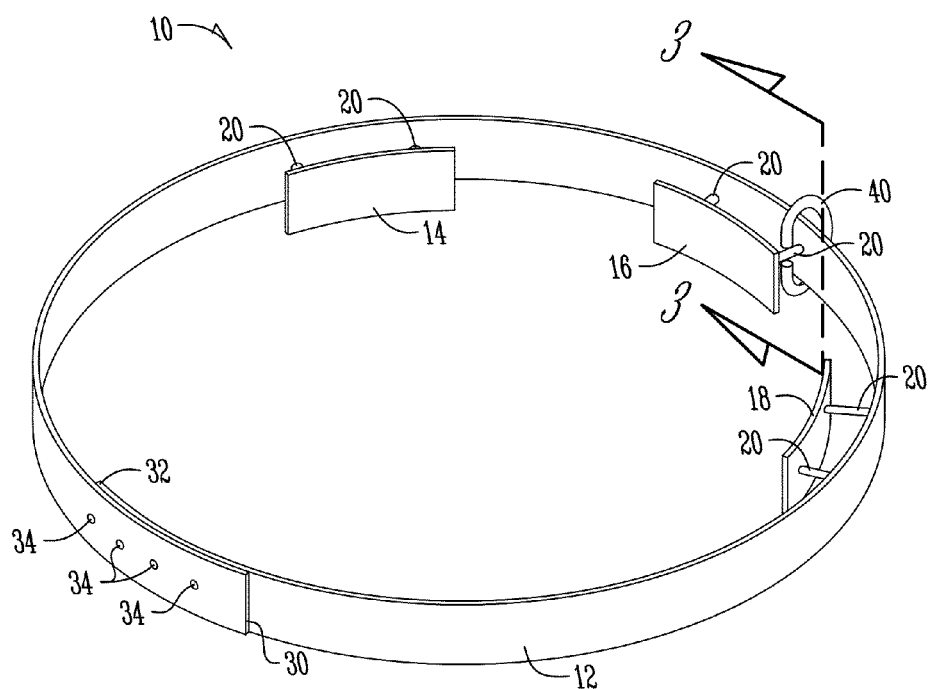
FIGS. 1-3 illustrate a first embodiment of a hands free dog walking system.

The hands free dog walker system may include a belt to be worn by a person. FIG. 1 illustrates one embodiment of such a belt. As shown in FIG. 1, the hands free dog walker 10 includes a belt 12 with a first end 30 and a second end 32. In this system, the belt 12 is preferably formed from a plastic material. The plastic material can be of any number of colors. A bright color, a neon color, or even a glow-in-the-dark material may be used. Although plastic is preferred, other materials may be used. It is also preferred that the belt 12 is formed from a rigid or semi-rigid material. On the inside surface of the belt 12 there are a plurality of spacers 14, 16, 18 on stands 20 which may be in the form of plastic screws or pins. Spacers 14, 18 may fit generally against the hips of a person and spacer 16 against the back of a person. The belt 12 may be wrapped around the waist of a person and pulled tight. The ends 30, 32 overlap and may be connected to the belt with a fastener of various types. One example of a fastener is a clip which may be removably attached through one or more of the holes 34.

A traveler in the form of a slotted D-ring 40 is also shown which travels freely around the belt 12. The slot in the D-ring 40 allows it to travel past the stands 20 of the spacers 14, 16, 18. Although the traveler is shown in the form of a slotted D-ring 40, the present invention contemplates that other forms of travelers may be used including other types of slotted rings. The first end 30 and the second end 32 of the belt 12 may be tapered so that they do not impede travel of the D-ring 40. A leash may be attached to the D-ring 40 so that a dog can move completely around a person wearing the belt 12 without entanglement. Note that the D-ring 40 would travel around the belt 12 on the inside of the belt 12 and not the outside of the belt 12.

Figure 2:
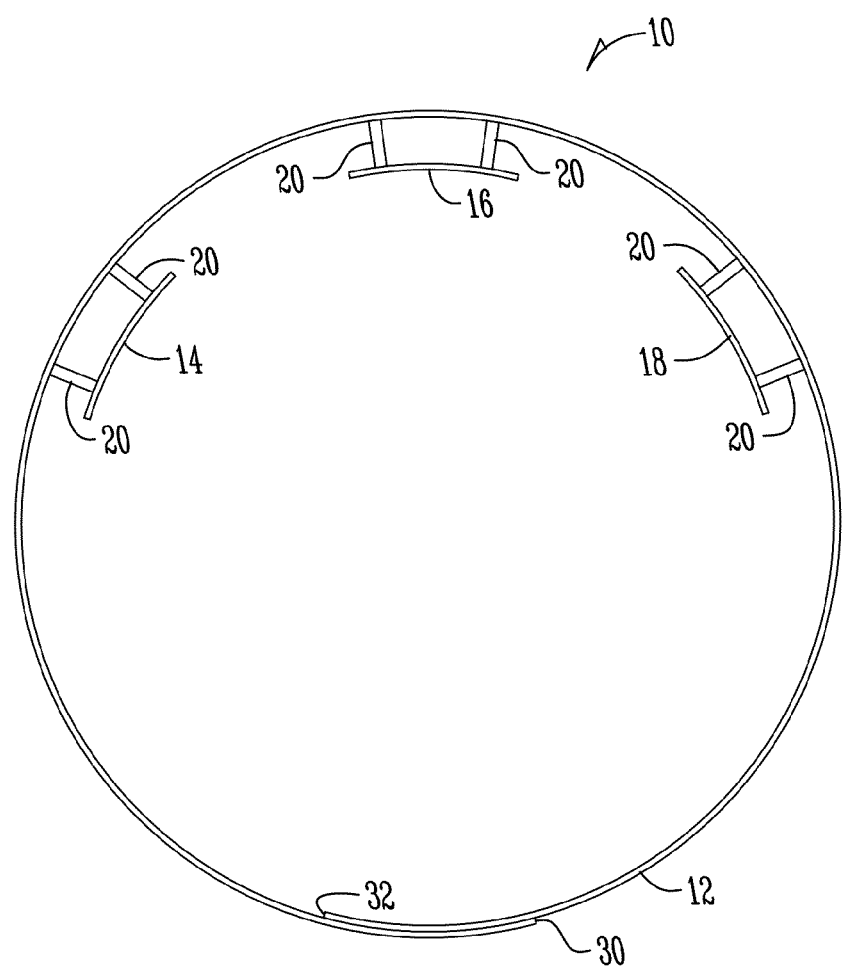
Figure 3:
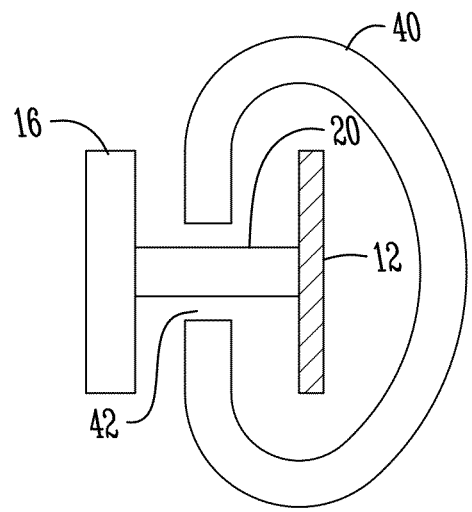

FIG. 2 provides a top view of the hands free dog walker of FIG. 1. FIG. 2 illustrates the stands 20 and spacers 14, 16, and 18. FIG. 3 provides a view of the D-ring 40 with a slot 42 sufficiently large enough to pass by the standoffs 30 of the spacer 16.

Figure 4:
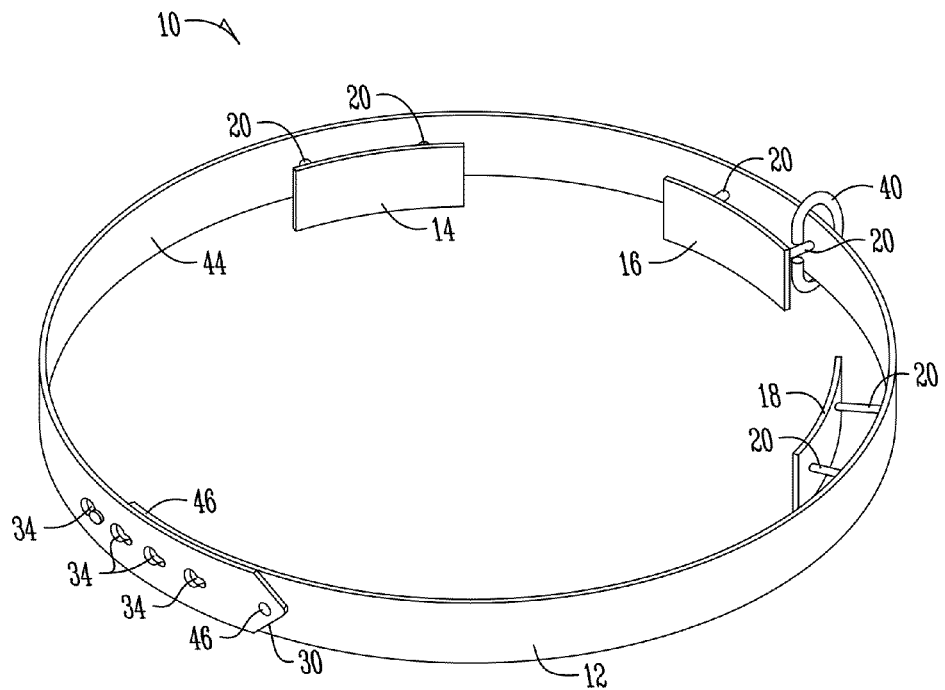
FIGS. 4-7 illustrate an embodiment of the hands free dog walking system.

FIG. 4 illustrates another embodiment of the hands free dog walker 10. In FIG. 4, an inset guide track 44 is shown which extends around the belt 12 to assist in guiding the traveler in the form of a slotted D-ring 40. In addition, there are various keyhole slots 34 in the belt 12 for matingly connecting with fasteners 46 which may in the form of pins. Other examples of fasteners include clips which may be inserted into holes in the belt to secure the ends 30, 32 of the belt. Instead of pins or clips, any number of fasteners may be used. For example, hook and loop type fasteners (such as VELCRO) may be used. Where VELCRO is used, it may be adhered to the belt with an adhesive or alternatively it may be secured to the belt 12 with rivets.

Figure 5:
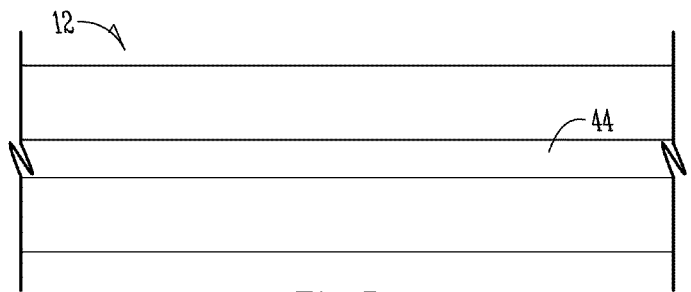
Figure 6:
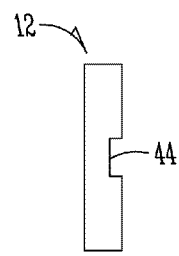
Figure 7:
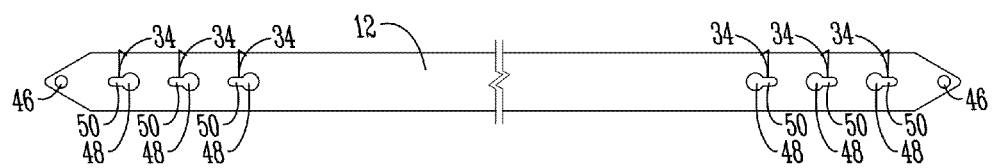

FIG. 5 and FIG. 6 further illustrate the inset guide track 55 of the belt 12. FIG. 6 provides a cross-sectional view of the belt 12. FIG. 7 illustrates another view of the belt 12 with keyhole slots 34 and fasteners 46. Each of the keyhole slots 34 is an aperture having a circular portion 48 and a slot 50 extending from the circular portion towards a nearest end of the belt. Note that each of the slots 50 points outwardly towards a nearest end of the belt.

Figure 8:
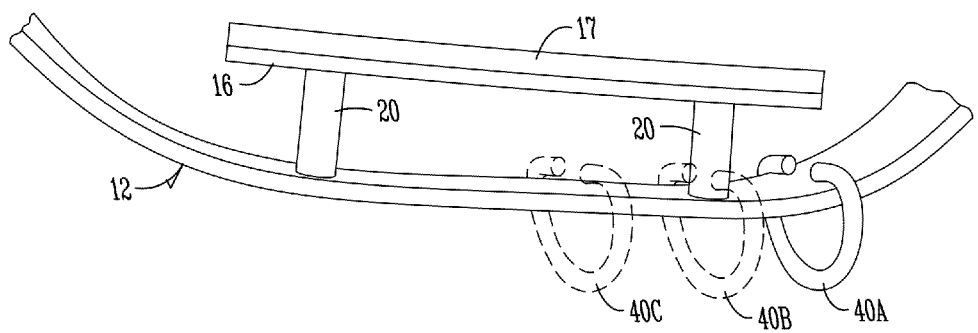
FIG. 8 illustrates movement of a traveler.

FIG. 8 illustrates another view of the belt 12 with stands 20 and a spacer 16 with a pad 17. The pad 17 may be formed of foam or other padding to increase the comfort of a user of the belt 12. FIG. 8 also illustrates different positions of a traveler 40A, 40B, 40C as it passes by one of the stands 20.

Figure 9:
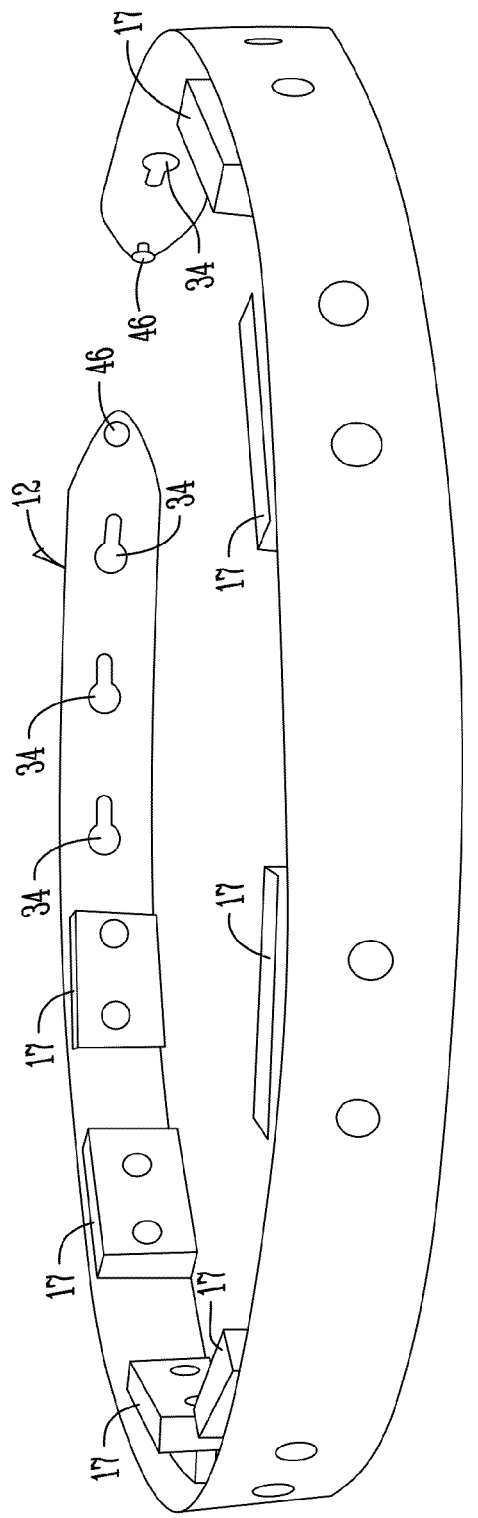
FIG. 9 illustrates an embodiment of the hands free dog walking system.

FIG. 9 illustrates another embodiment of the belt 12. FIG. 9 illustrates a plurality of pads 17 placed around the inside of the belt 12.

Figure 10:
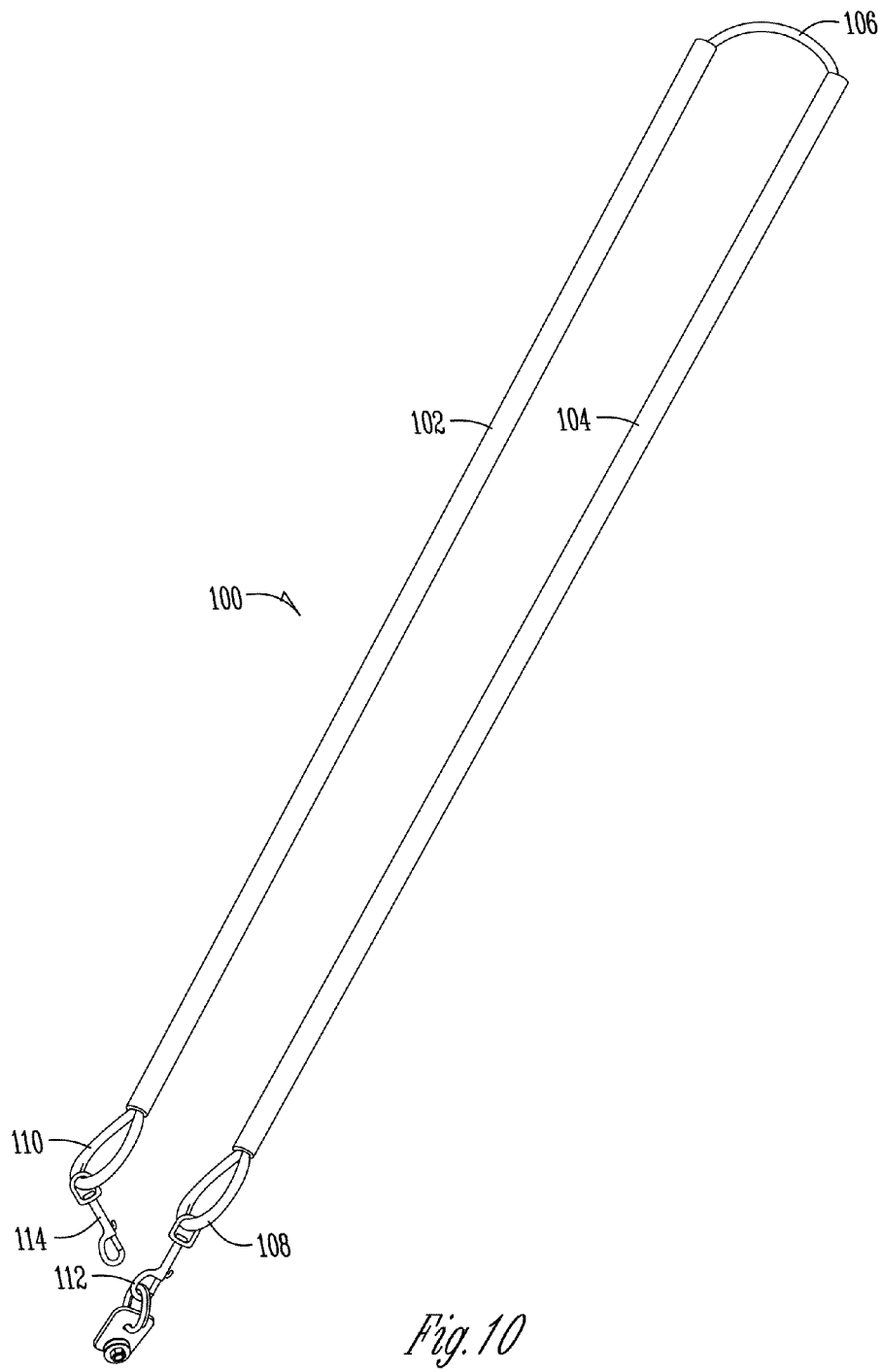
FIG. 10 illustrates an embodiment of a leash.

FIG. 10 illustrates one embodiment of a leash 100 which may be a part of the hands free dog walker system. The leash 100 has a cord 106 which may be made from any material and it is preferred that the material be a durable and weather resistant material such as nylon, cotton, or leather. The leash 100 incorporates a distal rigid body 102 and a proximal rigid body 104 which encompass the cord 106. The rigid bodies 102 and 104 may be made from any durable and weather resistant material such as PVC or any similar material. The distal rigid body 102 and the proximal rigid body 104 give the person walking the dog the ability to rapidly bring the dog to them whenever the need arises, e.g., approaching another dog, crossing an intersection, etc. The person merely grabs the proximal rigid body 104 and pulls it towards them. The leash 100 also has a distal clasp 114 for attaching to the dogs collar and a proximal clasp 112 for attaching to a portion of the belt (where used). Although two rigid bodies 102, 104 are shown, the present invention contemplates that other numbers of rigid bodies may be used as may be desirable in a particular application or appropriate for a particular leash length. For example, three rigid bodies each being two feet in length may be used to form a six foot leash. Alternatively, two rigid bodies each being three feet in length may be used to form a six foot leash. It should also be understood that the rigid bodies do not necessarily need to be of the same length. It should further be understood that the leash 100 may be used with or without one of the embodiments of the belt system described herein.

Figure 11:
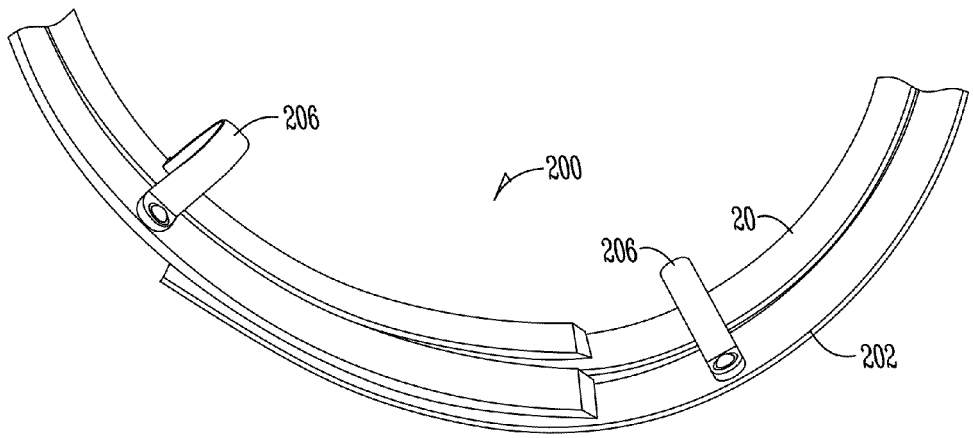
FIGS. 11-13 illustrate another embodiment of a belt.
Figure 12:
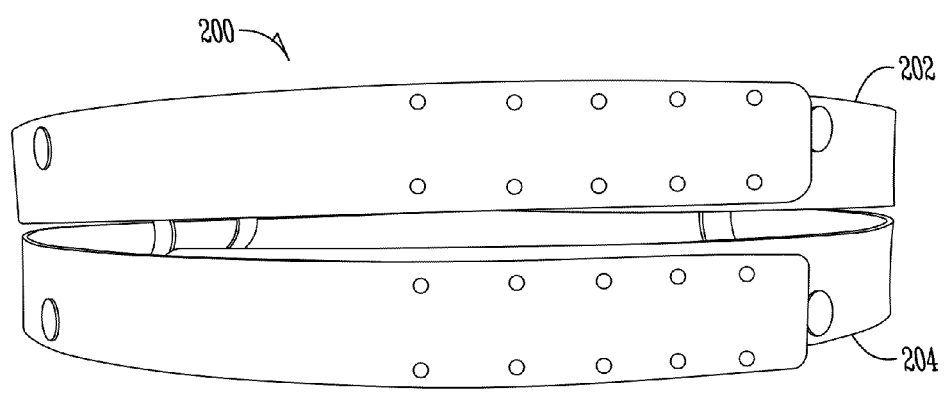
Figure 13:
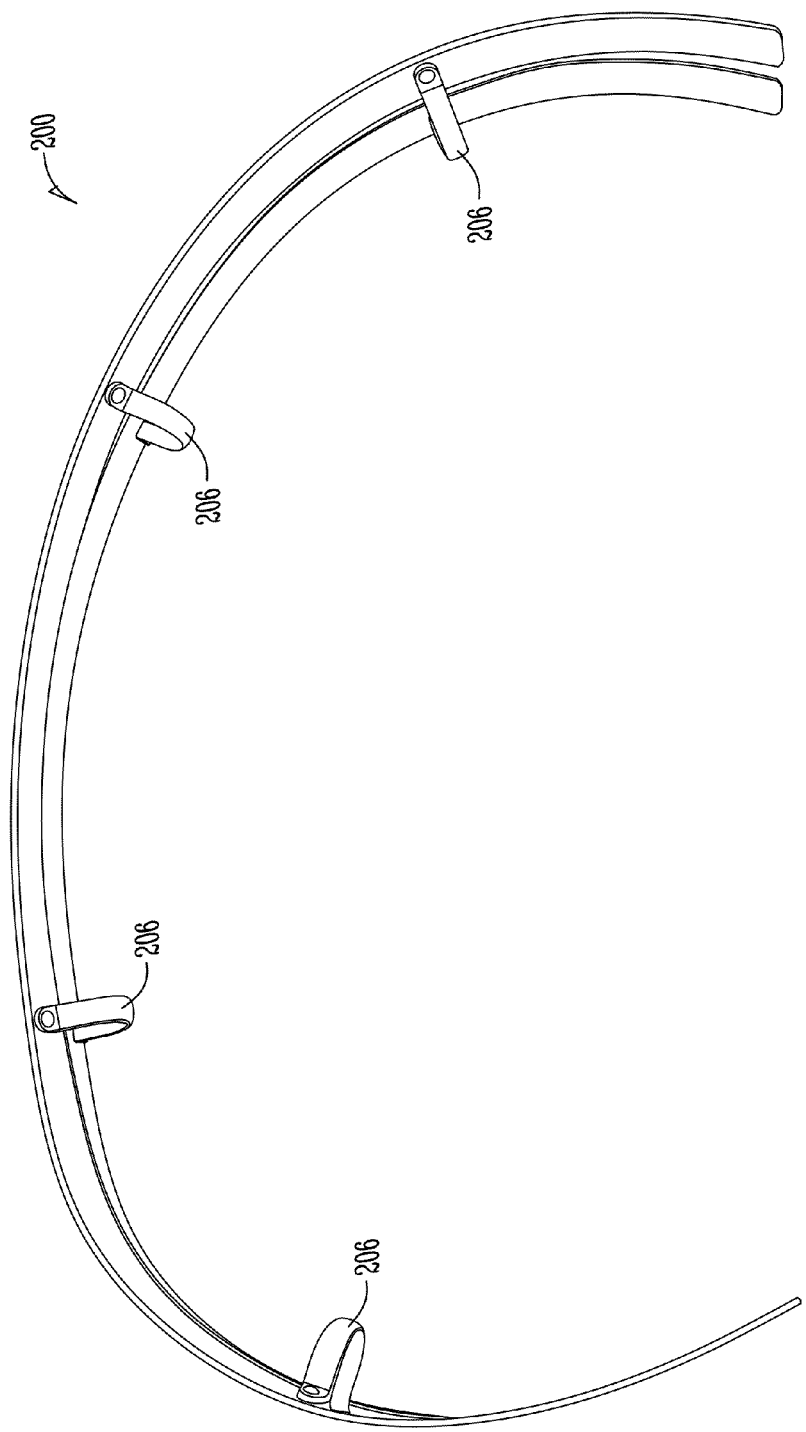

Another embodiment is shown in FIG. 11 through FIG. 13. As shown in FIG. 11, the belt 200 has a top and lower rail 202 and 204 respectively. The top rail 202 and lower rail 204 can made of any material such as plastic or metal which is flat. The rails 202 and 204 are preferably durable, weather resistant and are resilient. The top rail 202 and lower rail 304 have a length which allows for a universal fit for the majority of dog walkers (not shown). The top rail 202 may have a hook and loop fastener affixed at one end on the outside surface and on the other end the inside surface. The lower rail 204 may also have a hook and loop fastener affixed at one end on the outside surface and on the other end the inside surface. The hook and loop fastener strips provide the adjustability necessary for various sized individuals to wear the belt comfortably. The hook and loop fastener strips may be attached in various ways such as through adhesive, rivets, or otherwise. The top rail 202 and lower rail 204 are separated by a plurality of spanning brackets 206. The spanning brackets 206 are attached via a connector such as a rivet or screw or any suitable fastening device.

The spanning brackets 16 are positioned to allow a carriage free movement around belt 200. The top rail 202 and lower rail 204 are spaced apart to assist in allowing free movement of a traveler in the form of a carriage or glider around the belt 200. FIGS. 14 and 15 illustrate one embodiment of this carriage or glider which has a body 222. At one end of the body 222 is a ring 224 which may attach to clasp 226 of a leash. The opposite end of the body 222 has a through hole (not shown). As best shown in FIG. 15, the through hole allows a bolt 230 and a nut 234 to affix rollers 220, 232 in place.

A person preparing to take a dog on a walk will place the carriage or glider on the inside surfaces of the top and lower rails. The person will then adjust the belt to fit their waist size and secure this circumference by introducing the hook and loop fastener strips to each other thereby creating an endless loop. The proximal clasp of the leash is attached to the ring of the carriage/glider and the distal clasp of the leash is attached to the dog collar. The person may now walk their dog in a hands free manner.

During the walk, the dog can travel fully around the person without entangling the dog leash. During the walk, the person can bring the dog closer to them by pulling the dog towards them by grabbing hold of the proximal rigid body and/or the distal rigid body.

Figure 17:
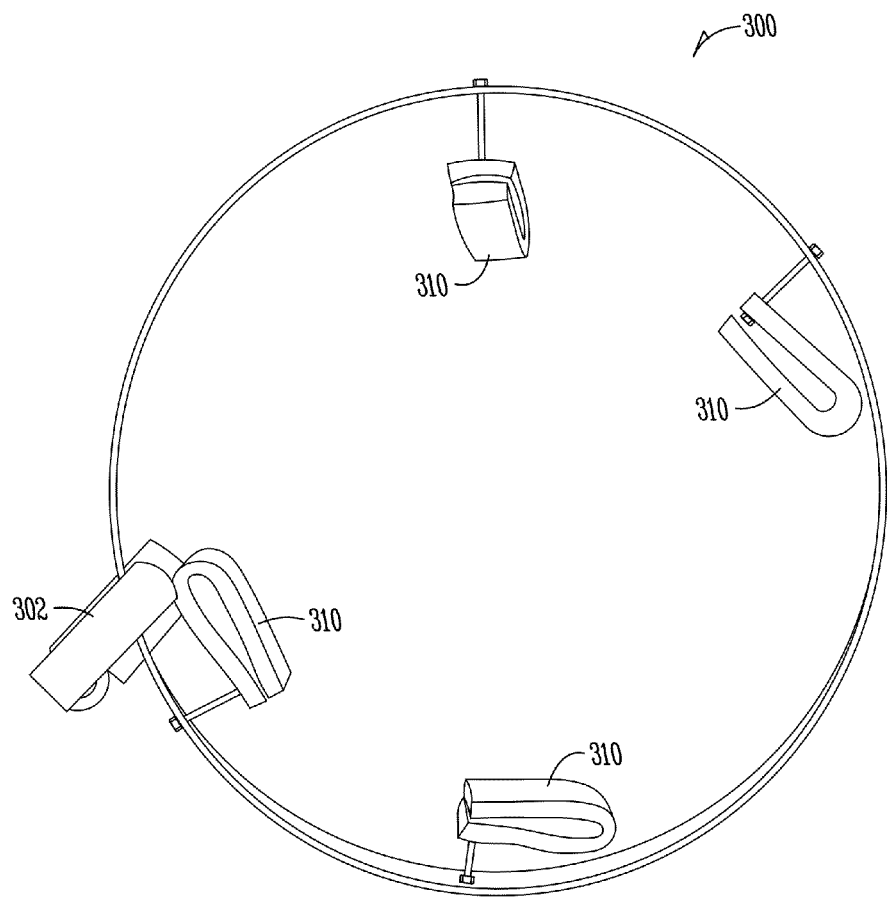

FIG. 16-17 illustrates another embodiment of a belt system 300. As shown in FIG. 16, a traveler in the form of a carriage 302 may be used which includes sides 302, 304 which are operatively connected together. A plurality of rollers 304 are a part of the carriage 302. A ring 306 is shown which is securely attached to the carriage and which is suitable for accepting the clasp of a dog leash. FIG. 17 illustrates a belt 308 with a plurality of spacers 310 and the carriage 302. The carriage is free to rotate fully around the belt 308 without impediment. As shown in FIG. 17, the belt may be formed from metal.

Figure 18:
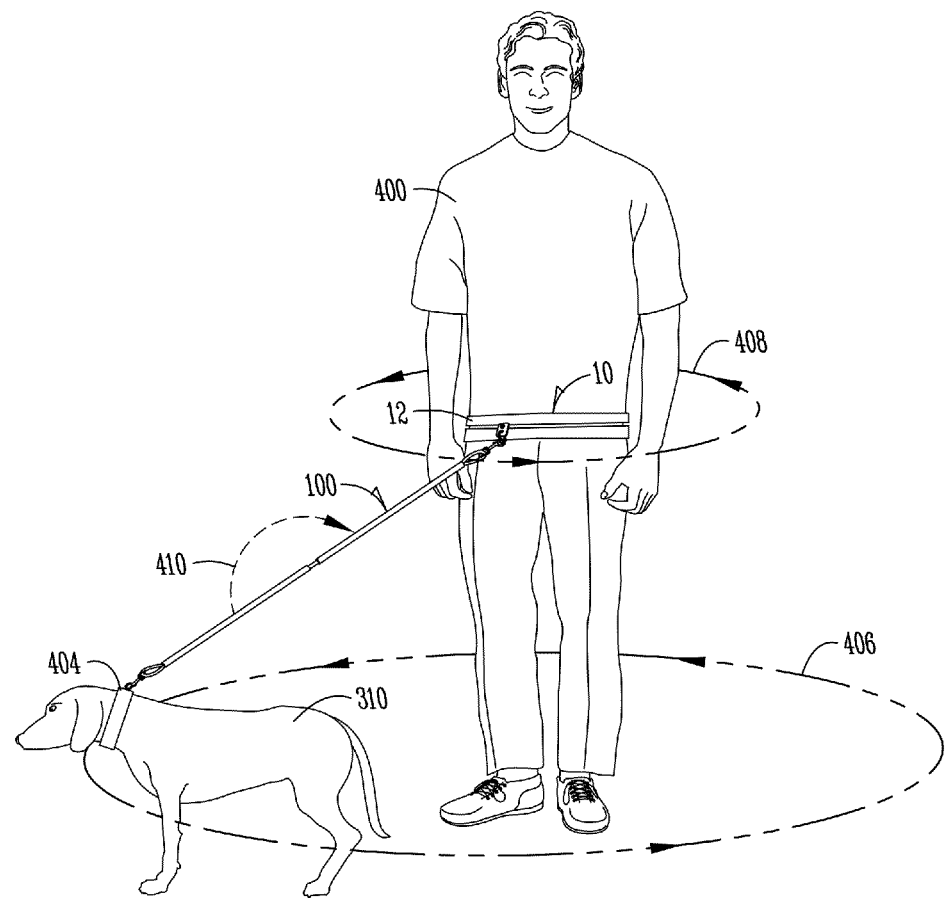
FIG. 18 illustrates the system in use.

FIG. 18 illustrates one example of a hands free dog walking system of the present invention in use. In FIG. 18 a person 400 is shown with the hands free dog walking system 10 including a belt 12. A dog 402 being walked by the person 400 is also shown. The dog 402 is wearing a collar 40. The collar 40 is operatively connected to a leash assembly 100. The dog 402 and its leash assembly 100 may rotate completely around the person 400 as indicated by line 408. In addition, the person 400 may control the dog 402 using the leash assembly 100 such as by bringing the rigid body 102 closest to the dog 402 closer to the person as indicated by line 410. Thus, the hands free dog walking system of the present invention provides multiple ways for improving control over a dog.

Although various embodiments of the belt system of the hands free dog walker have been shown and described, it is to be understood that the present invention contemplates numerous other variations and alternatives. It should also be understood that the present invention contemplates combining elements from different embodiments. For example, the present invention contemplates that any number of types of travelers may be used, the component parts may be formed of any number of different types of materials, any number of different types of fasteners or connectors may be used. In addition, the belt may be modified to improve aesthetics such as by using materials of varying colors or designs. Use of bright colors, neon colors, glow-in-the-dark material, or decoration such as with stripes may also enhance safety by making the belt and thus the person wearing the belt easier to see at night.

It should be further understood that although examples of fasteners have been provided, the present invention contemplates numerous other types of fasteners that may be appropriate in a particular design.

It should further be noted that although described in the context of dog walking, the present invention may be used for walking other types of animals, including children.

Although various types of fasteners, various geometries of structures, and various types of materials are shown or described herein, the present invention is not to be limited to that which is shown or described. The invention has been shown and described above with the preferred embodiments, and it is understood that many modifications, substitutions, and additions may be made which are within the intended spirit and scope of the invention.

What is claimed is:

1. A hands free dog walking system, comprising:
a belt for attaching around a person;
a traveler operatively connected to the belt to allow a leash operatively connected to the traveler to freely travel around the belt without entangling the person, wherein the traveler comprises a ring with a slot;
a pad attached to an inside of the belt with a stand whereby the pad is separated from the belt by the stand and the slot of the ring is configured to pass through the stand.

2. The hands free dog walking system of claim 1 further comprising an insert guide track along an inside middle of the belt.

3. The hands free dog walking system of claim 2 wherein the ring is a D-ring.

4. The hands free dog walking system of claim 3 wherein the belt comprises a plurality of apertures, each of the apertures having a circular portion and a slot extending from the circular portion towards a nearest end of the belt.

5. The hands free dog walking system of claim 4 further comprising a fastener on the end of the belt for matingly connect with one of the apertures.

6. The hands free walking system of claim 5 wherein the fastener comprises a pin.

7. The hands free dog walking system of claim 6 wherein the belt comprises plastic.

8. The hands free dog walking system of claim 7 wherein the belt is rigid.

9. The hands free dog walker of claim 1 further comprising a leash assembly for walking a dog with a leash, the leash assembly comprising (a) a first rigid body, (b) a second rigid body, (c) a cord threaded through the first rigid body and the second rigid boy, (d) a first connector attached to a first end of the cord, and (e) a second connector attached to a second end of the cord, wherein the second connector is removably attached to the traveler.

10. The hands free dog walking system of claim 1 wherein the traveler comprises a carriage and a plurality of rollers.

11. A hands free dog walking system comprising:
a belt for attaching around a person;
a traveler operatively connected to the belt to allow a leash operatively connected to the traveler to freely travel around the belt without entangling the person, wherein the traveler comprises a ring with a slot;
a plurality of pads attached to an inside of the belt with stands whereby the pads are separated from the belt by the stands and the slot of the ring is configured to pass through the stands;
a leash assembly comprising:
  (a) a first rigid body having an inner end and an outer end;
  (b) a second rigid body having an inner end and an outer end;
  (c) a cord threaded through the first rigid body and the second rigid body such that the outer end of the first rigid body is at a first end of the cord and the outer end of the second rigid body is at a second opposite end of the cord;
  (d) a first connector attached to the first end of the cord; and
  (e) a second connector attached to the second opposite end of the cord and removably attached to the traveler.

12. The hands free dog walking system of claim 11 wherein the belt comprises a plurality of apertures, each of the apertures having a circular portion and a slot extending from the circular portion towards a nearest end of the belt, and the belt further comprising a fastener on the end of the belt for matingly connecting with one of the apertures.

13. A hands free dog walking system comprising:
a belt for attaching around a person;
a traveler operatively connected to the belt to allow a leash operatively connected to the traveler to freely travel around the belt without entangling the person, wherein the traveler comprises a ring with a slot;

a plurality of pads attached to an inside of the belt with stands whereby the pads are separated from the belt by the stands and the slot of the ring is configured to pass through the stands.

* * * * *